Feb. 26, 1935.　　R. G. DE LA MATER　　1,992,911
HYDRODYNAMIC BRAKE FOR HOISTS AND THE LIKE
Filed March 26, 1932　　6 Sheets-Sheet 1

Feb. 26, 1935.                R. G. DE LA MATER                1,992,911
             HYDRODYNAMIC BRAKE FOR HOISTS AND THE LIKE
                  Filed March 26, 1932      6 Sheets-Sheet 2

Feb. 26, 1935.  R. G. DE LA MATER  1,992,911
HYDRODYNAMIC BRAKE FOR HOISTS AND THE LIKE
Filed March 26, 1932   6 Sheets-Sheet 4

Feb. 26, 1935. R. G. DE LA MATER 1,992,911
HYDRODYNAMIC BRAKE FOR HOISTS AND THE LIKE
Filed March 26, 1932 6 Sheets-Sheet 6

INVENTOR.
Robert G. De La Mater
BY Green & McCallister
His ATTORNEYS

Patented Feb. 26, 1935

1,992,911

UNITED STATES PATENT OFFICE 1,992,911

HYDRODYNAMIC BRAKE FOR HOISTS AND THE LIKE

Robert Griffin De La Mater, Parkersburg, W. Va., assignor to The Parkersburg Rig & Reel Company, a corporation of West Virginia Application March 26, 1932, Serial No. 601,337

60 Claims. (Cl. 188—90)

This invention relates to hoists, and more particularly to brakes therefor adapted to automatically govern the speed of descent of a load and which may be adjusted to permit various speeds of descent.

Brakes of the mechanical friction type, usually external contracting band brakes, have heretofore been used on hoists used in the well drilling industry. Limitation of space on the derrick floor has limited these brakes to a size inadequate to properly handle the loads imposed upon them. The proper application of these brakes in controlling the speed of the descending load has depended entirely upon the skill of the operator. Brakes of the type herein described have been developed to automatically govern the speed of the descending load and reduce the duty of the operator and the mechanical friction brake to that of stopping and holding the suspended load.

While the invention is particularly applicable to well drilling rigs, it is applicable to hoists in general for controlling the movement of overhauling loads.

In order to reduce the duty imposed on the friction-type brake, it is proposed to provide an hydro-dynamic brake or decelerating device that shall be capable of automatically governing the speed of descent of a load and holding the speed substantially constant, until the load has almost reached its point of destination, and then to utilize the band friction-type brake merely for stopping the load and/or holding it at the desired position. Thus the band brake merely overcomes the inertia of the load and is active only for a short period of time.

Since the band brake is inactive while the load is descending and active only during the time required to actually stop the load, the brake is subject only to nominal wear and heat. The life of such brakes are therefore greatly extended and the expense of replacing brake bands and drums reduced to a negligible amount. In addition, attractive savings may be realized because the equipment may be used continuously for long periods of time without expensive shut-downs for repairs.

Heretofore, the sand, calf and bull reels of cable tool drilling rigs, such as used for drilling oil wells, the draw works on rotary drilling rigs and service reels have been provided with individual band brakes (the so-called prony brakes) to control not only the speed of descent but also to stop the load suspended from the cables associated with such reels. Such brakes therefore must be applied continuously during the descent of the load. If the load must travel any appreciable distance, the energy that is expended in the brake is converted into sufficient heat to cause burning and excessive wear of the brake bands and drums. The deeper the drilling the greater is the duty imposed on such brakes, and it has been found in practice that when the depths of the wells exceed 5,000 feet, band brakes give so much trouble because of heating and excessive wear that the cost of maintenance and repairs becomes almost prohibitive. Furthermore, the smoke emitted from band brakes is so thick and dense at times, that the operators cannot see what is going on about them, thereby subjecting them to accident hazards as well as jeopardizing the equipment.

If it were possible to utilize mechanical friction-type brakes, with the equipment referred to above, of sufficient size and capacity, the difficulties with band brakes used heretofore, would be largely overcome. However, if the brakes were built large enough to give the required capacity, the size and bulk thereof would be such that they could not be used with the apparatus referred to above. The limited space available would not be sufficient to accommodate mechanical friction brakes of adequate size and capacity to assure safe and trouble free operation. Also, such brakes having the required size and capacity for satisfactory and trouble free operation, together with the mechanism required for their operation and control would be prohibitive in cost. Furthermore, drilling equipment must be portable and easy to move around in locations where transportation is generally difficult. The size and weight of brakes for such equipment is therefore vital.

Where hydro-dynamic brakes embodying the invention are employed in conjunction with band brakes of the type referred to above, the duty imposed on the band brakes will not exceed the capacity thereof even though the wells are as deep as it is physically possible to drill them, because the band brake is used merely to stop and/or hold the load, and the length of time required to stop such a load is practically the same for all depths of wells for a given load and speed of descent. During the descent of the load, the heat developed in the hydro-dynamic brake is easily disposed of by the circulation of a liquid therethrough which enters into the braking action of such brake, but which through recirculation may be continuously cooled during the descent of the load.

In my copending application, Serial No. 476,182, filed Aug. 18, 1930, there is disclosed a combination of an hydro-dynamic brake operating in conjunction with a band or prony-type brake for controlling the speed of descent of hoisting cables such as employed with oil well drilling equipment. This copending application is directed more particularly to means for controlling the operation of the hydro-dynamic brake and the mechanical brake and to an arrangement of clutches disposed between the hoist drum and prime mover or power operated means, and between the hydro-dynamic brake and the hoist reel.

Since it is quite common in the oil fields, where extensive drilling operations are carried on, that one or more drill rigs are inactive and not in use, material savings could be realized if parts of such equipment could conveniently and readily be removed from inactive rigs and mounted on other rigs which are ready for use. Also, while the drilling of a well is in the initial stages and has not progressed beyond two or three thousand feet, the band brakes may be relied on entirely, so that the fluid friction or hydro-dynamic brake may be shifted to other rigs where the depth of the wells requires the service of the hydro-dynamic brake and the braking requirements have or are about to exceed the capacity of the band brakes.

An object of this invention is the provision of a new and improved brake system for hoists, such as are employed in the drilling of oil wells, that shall include a fluid friction brake capable of controlling and governing the speed of descent of a load being lowered by the hoist, and a mechanical brake that shall be capable of stopping the hoist at will.

Another object of this invention is to provide a self-contained hydro-dynamic brake which may be used interchangeably with existing equipment so that it will not be necessary to devise a special brake of this type for each and every rig to which it may be applied.

Another object of the invention is the provision of a hydro-dynamic brake of the liquid friction type that may be utilized and effectively operated without the use of pumps for forcing liquid into the brake under pressure.

A further object of the invention is the provision of improved means for introducing liquid into hydro-dynamic brakes and for controlling and regulating the braking effort developed thereby.

A still further object of the invention is the provision of a brake that shall be capable of operating with varying quantities of liquid therein, that is, a brake that shall function in its intended manner whether full of water or liquid, or only partially full, the quantity of liquid therein determining the resistance.

A further object of the invention is to provide an improved type of hydro-dynamic brake having means associated therewith for insuring positive and effective discharge of water from the outlet thereof.

Other objects of the invention will, in part, be apparent and will, in part, be obvious from the following description taken in conjunction with the accompanying drawings in which.

Throughout the drawings and the specification like reference characters indicate like parts.

Figure 1:
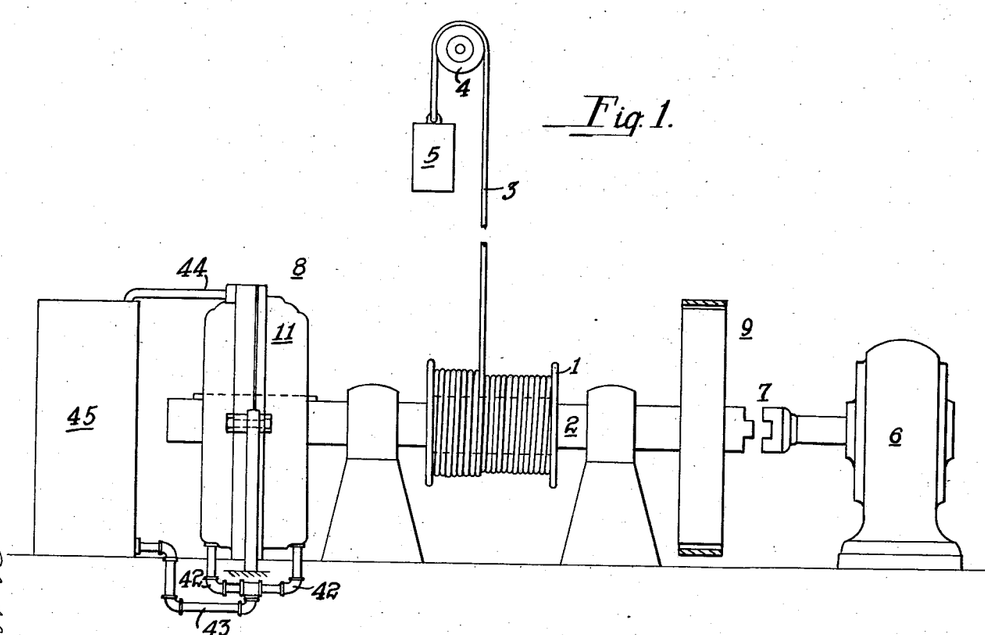
Figure 1 is a diagrammatic illustration of a hoist rig having a dynamic brake therefor arranged and constructed in accordance with an embodiment of the invention.

In Fig. 1 of the drawings, an application to which the invention may be put is schematically illustrated. Such an application includes a drum or reel 1, mounted on a shaft 2. A cable 3 wound on the drum operates over a pulley 4 and has a load 5 suspended therefrom which may be raised or lowered by either winding the cable on the drum or spooling it out in case the load is to be lowered.

In order to raise the load, the motor 6 coupled to the shaft by a jaw clutch 7 is utilized to turn shaft 2 in such direction that the cable is wound on the drum or reel. To lower the load, the motor is disconnected from the shaft, permitting the load to fall under the action of gravity. To control the speed at which the load falls and to finally bring it to rest or to a stop at the desired spot, a hydro-dynamic brake 8 and a manually operable brake, such as a band or mechanical friction brake 9 are provided. The hydro-dynamic brake is mounted on the shaft and is so constructed that when the load is raised, the brake does not offer any resistance to turning of the reel shaft. However, when the brake is placed in operative condition and the load is permitted to fall, the speed of the load will increase until the energy expended in the hydro-dynamic brake is equal to the kinetic energy developed by the load. When the load has reached or is approaching its destination, the manually operable brake is applied to stop the load. However, the only duty which is imposed on the manually operable brake is that required to overcome the inertia of the load and to hold the load at the desired position. Since the inertia of the load represents only a relatively small amount of energy, the reel and the load may be stopped in a very short distance after the manually operable brake has been applied. Since this brake is applied for only a short period of time, the amount of heat expended in the brake band and in the brake drum or brake flange, is relatively small thereby reducing to a minimum the burning of the brake band and drum and the wearing thereof caused by friction.

The drum or reel 1, for purpose of illustration, may be taken as representing either the sand, calf or bull wheel or a draw works, all of which are used independently to handle various tools which go to make up the equipment for drilling wells. Tools are lowered into and raised from the well in accordance with usual practice. The tools may be raised rather slowly from the well because of limited power, but are dropped as fast, as safety permits, into the well. Heretofore band-type brakes have been relied on entirely to control the speed of descent, and to stop the load at the desired spot. The band-type of brake has been tolerably satisfactory in shallow drilling operations, but where deep drilling (depths below 5,000 feet) is involved, the cost of maintaining mechanical friction brakes in serviceable condition has been almost prohibitive. However, if the speed of descent is controlled by other means, such as the hydro-dynamic brake mentioned above, the load may be dropped to unlimited depths without difficulty and at practically any desired speed, because the depths to which such tools or loads are dropped, are no longer factors so far as the band brake is concerned.

For example, the load 5, which may represent well casing, drilling tools, or apparatus for bailing the wells, may be dropped into a well 7,000 feet or more in depth at almost any speed without applying the band brake until the load has almost reached bottom. While the load is dropping at a high rate of speed, the hydro-dynamic brake governs the speed of descent and holds the speed at a practically constant value. When the load is almost to the bottom, the band brake is applied. In practice it is found that the band brake is capable of stopping the load within five or ten feet which represents about one to three turns of the reel after application of the brake. It has been found that the heat expended in the brake drum during such a short period of application, has hardly been sufficient to raise the temperature of either the brake band or drum to a noticeable value even after numerous applications.

The liquid employed in brake 8 may be water, oil or other liquid suitable for the purpose, stored in a tank or suitable container. The level of the liquid in the container is so adjusted that the brake may be partially filled or completely filled according to the braking action desired. Also the brake is so designed that it is not necessary to deliver the water thereto under positive pressure. The hydro-dynamic brake illustrated at 8 is designed for construction as a self-contained unit so that it may be mounted on shaft 2 or taken off and mounted on shafts of other drill rigs, thereby obviating the necessity for special shafts and making it possible to use the brake interchangeably on equipment already in the field.

Figure 2:
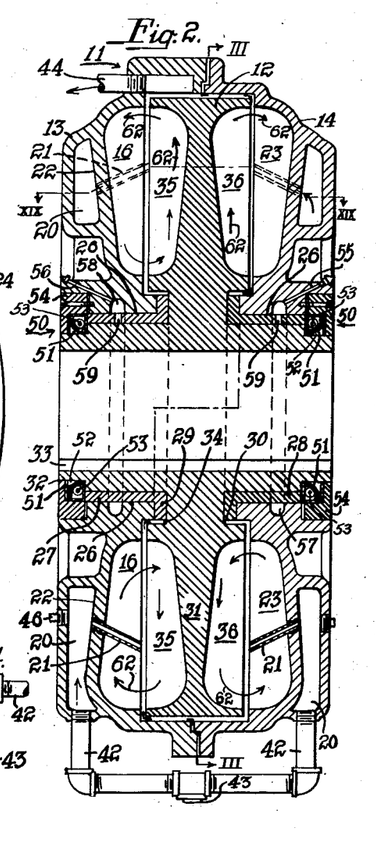
Fig. 2 is a vertical sectional view, taken on line II—II of Fig. 3 of a dynamic brake constructed in accordance with the invention.
Figures 3, 3A, 4:
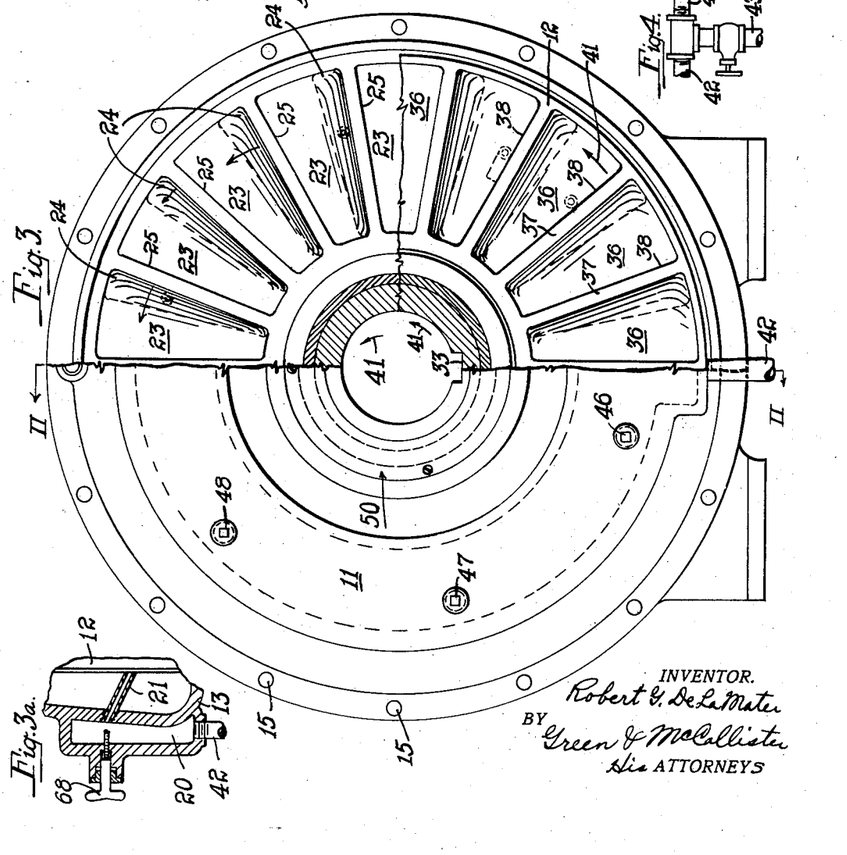
Fig. 3 is a view, partly in side elevation and partly in section taken on line III—III of Fig. 2.
Fig. 3a shows a form of needle valve control adapted for use in the brake shown in Figs. 2 and 3.
Fig. 4 is a fragmentary view of liquid inlet pipes for the brake of Figs. 2 and 3.

The hydro-dynamic brake may take different forms, as illustrated by the various designs shown in Figs. 2, 3; 5, 6; and 7 to 13, inclusive. Each form of brake is so designed that variable braking efforts may be obtained. While it is possible with each form of brake to regulate the braking effort, and hence the speed of descent of the load, each form embodies different features of construction, so that some of the forms are more adaptable to particular applications than others.

The brake shown in Figs. 1, 2 and 3 comprises a stator 11 having a rotor, or impeller, 12 therein which is rotatably supported by the stator. The stator is made up in two parts or halves 13 and 14 which are bolted together at their rims as indicated at 15. A plurality of radially extending pockets, cups or recesses 16, disposed concentrically about the axis of rotation of the rotor, are formed on the interior of the stator part 13. The pockets or cups are separated from each other by sloping or inclined vanes, blades, or partitions 17 (see Figs. 18 and 19). Thus, in effect, each pocket or cup is slightly overlapped by an adjacent cup. The top of each vane or partition is made flat and parallel to a plane disposed perpendicular to the axis of the rotor so that a knife edge 18 is formed on each vane or partition (see Figs. 18 and 19).

In order that liquid may be introduced into some or all of the stator pockets, annular chambers 20 are formed on the exterior of the stator part 13. The liquid may be introduced into the pockets by means of nozzles 21 threaded into openings formed in a wall 22 that separates the pockets from the annular chamber 20. A nozzle 21 may be provided for each stator pocket, for every other pocket, or for every third or fourth pocket, depending upon the braking capacity required and the rate at which it may be necessary to introduce liquid into the brake to replace the heated liquid which is discharged therefrom.

Figure 18:
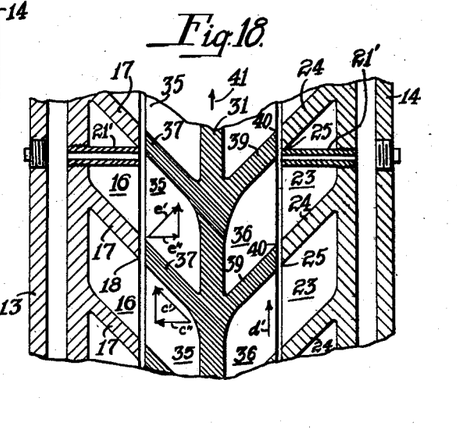
Fig. 18 is a fragmentary view of the brake of Figs. 2 and 3 taken on a line corresponding to line XIX—XIX of Fig. 2 showing a modified arrangement of inlet nozzles.
Figure 19:
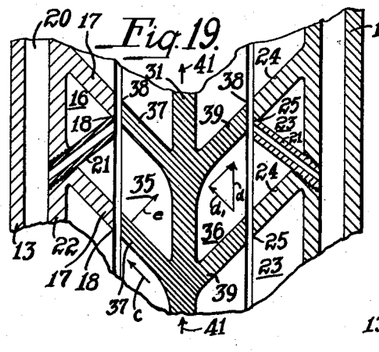
Fig. 19 is a similar view taken on line XIX—XIX of Fig. 2 showing an arrangement of inlet nozzles.

The nozzles may be disposed parallel to the axis of rotation of the rotor as shown in Fig. 18, or the nozzles may be disposed at an angle as illustrated in Figs. 2 and 19. In each case, the discharge end of the nozzle terminates at or near the knife edge of the vanes or partitions of the pockets in which they are located. The theory of operation and the effectiveness of the nozzles mounted as shown in Figs. 18 and 19 will be described later herein.

Stator part 14 is provided with a plurality of cups, pockets or recesses 23 of the same shape as pockets 16 and they occupy the same relative position. The pockets are separated by sloping or inclined vanes, blades, or partitions 24 each having a knife edge 25 formed thereon at its leading edge.

The central portions of the stator parts are provided with alined openings 26 to accommodate bushings 27 and 28 which serve as bearings for the rotor. The bushings have flanges 29 and 30, respectively, at their inner ends which serve as thrust bearings for the rotor.

The rotor is formed as a unitary element and comprises a disc portion 31 having a hollow hub 32 disposed in the bushings, that serves as a journal or axle therefor. The bore of the hub is such that a shaft (the shaft 2 of Fig. 1 for example) may be received therein or extended therethrough. The hub is also provided with a keyway 33 so that the rotor may be keyed to the shaft on which the brake is mounted. On each side of disc portion 31, concentric annular grooves 34 are formed to accommodate the bushing flanges 29 and 30. These flanges, as stated above, act as thrust bearings and hold the rotor in alinement with respect to the stator parts 13 and 14.

Each side of the disc portion is provided with a plurality of cups or pockets 35 and 36, respectively, of substantially the same size and shape as the pockets in the stator parts 13 and 14. The pockets 35 are separated by sloping or inclined vanes, blades, or partitions 37. Also the outer edges of vanes or partitions 37 are made flat and parallel to edges of vanes or partitions 17 so that knife edges 38 are formed at the leading edges thereof.

The cups or pockets formed in the opposite side of the rotor are separated by sloping or inclined vanes or blades 39. Vanes or partitions 39 are also flat on their outer edges to provide knife edges 40 at their leading edges.

As seen in Figs. 18 and 19, stator vanes 17 and rotor vanes 37 slope in the same direction. In other words, stator vanes 17 project inwardly towards the rotor and are inclined in a direction generally opposite to the direction of rotation of the rotor when functioning to develop braking effort, and rotor vanes 37 project outwardly from the disc portion thereof and are inclined forwardly in the same general direction as the rotor rotates when developing braking effort.

In like fashion, stator vanes 24 and rotor vanes 39 slope in the same direction. That is, the stator vanes project inwardly towards the rotor and slope in a direction generally opposite to that in which the rotor is rotating when it is developing braking effort; and the rotor vanes project outwardly from disc portion 31 towards the stator and slope in the same general direction in which the rotor rotates when it is developing braking effort.

Because of the angular relation and location of the stator vanes to the adjacent rotor vanes, the pockets or recesses of the stator and rotor react, with the liquid in the brake, in such manner as to oppose and resist rotation of the rotor when driven in the direction of arrow 41.

When the brake illustrated is operated to develop braking effort, rotor 12 is rotated in the direction of arrow 41 and when rotating in this direction, the knife edges on the rotor partitions or vanes move toward and past the knife edges on the stator partitions; thus jets of liquid thrown out of the rotor pockets are cut or sheared by the knife edges whereby some, if not most, of the braking action is brought about.

If the rotor is rotated in the opposite direction, no braking action takes place as will be explained later herein.

In order that water may be introduced into the brake, the annular chambers 20 are tapped at their bottoms to accommodate pipes 42 which are connected to a pipe 43 leading to a tank or other container in which liquid or water is stored, such as the tank 45 shown in Fig. 1. To provide for the circulation of water or liquid through the brake so that fresh cool water may always be available to replace warm water discharged from the brake, the top of stator part 13 is tapped to accommodate a pipe 44 that leads to the tank into which the water is discharged. The liquid thrown out from the rotor pockets to the rim of the stator is discharged through pipe 44 into tank 45 from which it is recirculated through the brake.

In order that the amount of liquid initially introduced to the brake (that is when the brake is stationary) may be regulated and so that the brake may be operated either partially full or full of liquid, the annular chambers 20 are drilled and tapped to accommodate either drain plugs 46, 47, and 48 or cocks. If it is desired to operate the brake with the water or liquid level at the level of plug or cock 46, the cock is opened and the water discharged from the tank until the level in the tank is equal to the level at the plug. The cock is then closed. It will therefore be apparent that only a relatively small amount of liquid is contained in the brake. There being only a relatively small amount of liquid in the brake, the braking action developed at any particular speed is less than if the brake contained more liquid. If it is desired to develop a higher braking action, the water level in the tank is raised to the point at which the level of the water in the brake is at the desired point, as for example, if the level of liquid is at the level of cock 47 or 48 or at a level such as will completely fill the brake.

If the rotor of the brake is stationary and is only partially filled with liquid, the remaining space therein is filled with air. When the brake is set in motion to function as a brake, the same volume of liquid and air will be confined therein, as when stationary, for reasons hereinafter set forth. If no liquid were circulated through the brake, the temperature of liquid would rise to a point where the brake would be rendered inoperative. Therefore, in practice, liquid is discharged from the brake and fresh cool liquid introduced to replace it, thereby keeping the temperature of the liquid in the brake below the critical value.

If the brake contains an initial charge of liquid, and the discharge port thereof is open, and the brake is set in motion, liquid is thrown out to the stator rim and seals off the interior of the brake from the atmosphere. Therefore, the volume of air in the brake is trapped and cannot escape. However, with liquid discharging from the brake, the volume of liquid tends to diminish which reduces the pressure of the air in the brake. Such reduction in pressure causes cool liquid to flow into the brake to replace that which is discharged, as will be explained later herein. Thus, the volume of liquid and air in the brake will remain practically constant and the volume of liquid will be the same as that originally introduced with the brake stationary.

In order to prevent the escape of liquid from the brake through the space between the bushings 27 and 28 and the hub of the rotor, seals 50 are mounted in the outer ends of the bores of the stator parts 13 and 14. Each seal comprises a ring 51 of flexible material, such as leather or fibre. The ring as shown, is somewhat parabolic in transverse section and disposed in a retaining ring 52 of somewhat U-shape in section. Each sealing ring 51 is yieldingly urged into engagement with the rotor hub by means of a coil spring 53 formed in the shape of a ring. As shown, the inner edge of the sealing member 51 rests on the hub of the rotor. Since the inner flange of the retaining member 52 is shorter than the outer flange which bears on the hub, the sealing ring is exposed to the pressure of the liquid in the brake, and this pressure tends to hold the sealing ring tightly on the hub.

Each seal 50 is held in place by means of a housing member 54 which is received in a circular recess formed in the respective stator parts and secured to such parts with screws or the like.

In order to lubricate the surfaces of the hub and bushings which have frictional engagement, the stator parts are drilled as at 55 and 56, and grooved at 57 and 58 to accommodate lubricant. The bushings are drilled as at 59 so that lubricant confined in the grooves may flow to the surfaces requiring lubrication. If oil is used as the operative liquid for the brake, lubrication of the rotor hub and bushings may be automatically take care of.

Assuming that the brake shown in Figs. 2 and 3 has been mounted on a shaft, such as shaft 2 of Fig. 1, and the stator rigidly secured to a base or foundation and that the supply tank shown in Fig. 1 has been filled with liquid to a level such as will fill the brake to the level of preselected cock 47, for example, the operation of the brake may be described as follows:

If load 5 is being raised by the hoist cable, the rotor rotates in the direction of arrow 41' and there is no reaction set up between the liquid and the rotor and stator partitions or vanes and recesses of the kind that will retard or oppose rotation of shaft 2. This may be explained by the fact that the rotor is turning at slow speed and that knife edges of the rotor and stator partitions are not cutting swiftly moving jets of liquid, and also because liquid is not drawn into the brake through the inlet passages or nozzles.

However, when the load is released and permitted to fall freely under the action of gravity, the rotor rotates in the direction of arrow 41, the acceleration of the load causing the rotational speed of the rotor to increase rapidly from the moment the load starts to fall. As the peripheral speed of the rotor pockets increases, the liquid collected therein is thrown radially outward as indicated by vectors 62 in Figs. 2 and 3 to the outer ends of the pockets. Since the outer ends of the pockets are curved outwardly toward the stator, the liquid is directed across the space between the rotor and stator pockets and into the stator pockets as indicated by vectors 62. Because of the shape and curvature of the stator pockets, the liquid is directed downwardly and discharges from the inner ends of the pockets into the inner ends of the rotor pockets where the liquid is again caught by the partitions and again thrown outwardly by centrifugal force.

As the liquid is thrown from rotor to stator pockets in the form of high velocity jets, the rotor vanes behind such jets cut through them as they pass across the vanes in the stator pockets. The cutting of these high velocity jets which move from the rotor to the stator pockets and thence back to the rotor pockets requires the expenditure of power and energy. Since this energy must come from the rotor which is driven by the descending load, the rotor is retarded. The faster the rotor rotates the greater is the retarding effect. Thus, when the power expended by the rotor in cutting through the liquid and by friction between the liquid and the walls of the pockets is equal to the kinetic energy of the falling load, further acceleration of the load ceases, causing it to descend at a constant speed. While a great deal of the energy is absorbed or expended by the cutting of the above mentioned high velocity jets, a great deal of energy is also absorbed by friction between the water which is moving along the surface of the stator pockets, and partly by the sudden stopping of some of the swiftly moving liquid upon striking the walls of the stator pockets.

If the brake is only partially filled with water or liquid, it will be apparent that the area of the jets which are thrown back and forth from rotor to stator pockets will be relatively small. Since the area of the jets is relatively small, the power expended in the cutting of these jets by the rotor vanes will also be relatively small. Thus, the more liquid that is contained in the brake initially and maintained therein while running, the greater will be the braking action because the area of the high velocity jets will be greater, and further, more energy will be absorbed by friction between the surfaces of the rotor and stator pocket surfaces.

The building up and the retarding of the velocity of the fluid as it is thrown from the rotor pockets or recesses to the stator recesses and then back to the rotor recesses, the fluid friction against the walls of the recesses, the cutting of the fluid streams or the high velocity jets by the partitions or vanes separating the recesses as they pass from rotor to stator and stator to rotor, and the sudden stoppage of some of the liquid striking the stator pocket walls, absorb the work that the rapidly descending load is imparting to the reel shaft 2. The energy absorbed is transformed into heat which raises the temperature of the liquid. However, since the liquid is continually circulating through the brake, warm liquid is discharged and fresh cool liquid introduced thereby tending to maintain the temperature of the liquid in the brake at a low value.

Since the water discharged from the brake must be replaced and reintroduced to the brake in the most effective manner for effective and efficient braking action, the placing of the tubes or pipes which carry the fluid from the annular chambers formed on the stator parts 13 and 14 requires consideration.

Hydro-dynamic brakes of the prior art, as known to me, required a brake full of liquid in order to function properly, and further the liquid which replaced the warm liquid discharged therefrom, had to be introduced at high pressures, say twenty pounds per square inch and upwards. Such brakes therefore required a pump of some sort to force the liquid through the brakes. Such brakes being under high internal pressure it was difficult to keep the packing and seals in good condition and required frequent replacement.

By properly placing the inlet openings by which the liquid is conducted into the brake, I have found that it is not necessary to force the liquid into the brake under pressure, and have utilized the internal action of the brake to induce the necessary circulation.

Since the majority of the fluid or liquid which is thrown from the pockets of the rotor to the pockets of the stator, is concentrated at the outer ends of the recesses, and that thrown from the stator to the rotor is concentrated at the inner ends of the stator recesses, the tubes or nozzles are located preferably at a point where the turbulence and resistance to the entry of water through these nozzles would be the least. The point at which the least resistance is offered to the introduction of water to the rotor recesses is approximately at a point located two-thirds up from the inner ends thereof.

The preferred arrangement and location of the nozzles is shown in Figs. 2 and 19. The nozzles or tubes 21 are inclined in the direction of rotation of the rotor and in the direction of the velocity of the fluid or liquid passing from the innermost ends of the rotor recesses to the outermost ends thereof.

The velocity of the liquid in the direction of rotation of the rotor is indicated by vector $d$ and has a component $d_1$ which assists the flow of liquid out of tubes 21. If, as indicated in Fig. 19, the liquid in the recesses of the rotor has a velocity in the direction of vector $c$, it neither assists nor retards the flow of liquid out of the tubes, but if the velocity of the liquid in the recesses of the rotor is in the direction of $d$ or $e$, such velocity will have a component assisting the flow of liquid out of the tubes.

By arranging the nozzles or tubes 21 in the manner indicated in Figs. 2 and 19, the introduction of liquid to the rotor pockets is made more positive and insures that there will be sufficient liquid in the rotor pockets to replace the warm liquid discharged from the brake, without forcing such liquid into the brake under pressure.

Figures 5, 6:
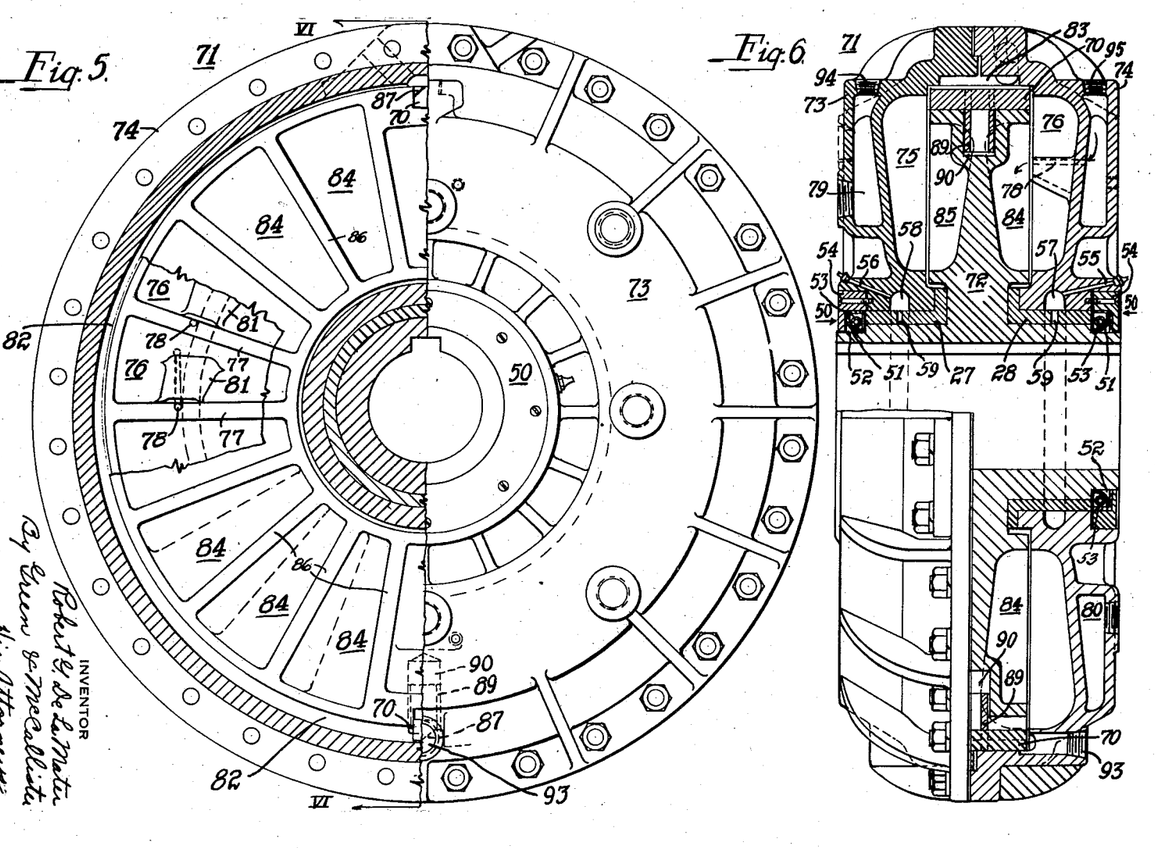
Fig. 5 is a view partly in section, a section of the rotor being broken away, of a brake embodying a modified form of the invention.
Fig. 6 is a view in section of the same brake taken on line VI—VI of Fig. 5.

In Fig. 18 an optional arrangement of nozzles or tubes is shown. Although this arrangement does not have all the advantages of the arrangement of the nozzles or tubes 21 illustrated in Fig. 19, such arrangement is still superior to the prior art arrangement of introducing liquid which was by drilling holes crosswise through the stator vanes or partitions as shown in Fig. 5. In accordance with the prior art arrangements, the flow of liquid entering the rotor pockets through the holes or passages in the stator vanes was opposed by the rotation of the rotor past these passages. This arrangement, therefore, impeded the introduction of liquid to the rotor pockets and for this reason pumps were utilized with the prior art devices to insure that sufficient liquid would be present in the rotor pockets to produce the required braking action and to insure that sufficient cool liquid would be supplied to the brake as would be required to replace the warm liquid discharged therefrom.

If, as indicated in Fig. 18, the velocity of the liquid in the rotor recesses is in the direction of the vector $d'$, it neither aids nor impedes the flow of liquid through the tubes or nozzles 21'. If the velocity of the liquid in the rotor recesses is in the direction of vector $e'$ it has a component $e''$ which aids the flow of liquid through the tubes 21' and if the velocity of the liquid in the rotor recesses is in the direction of vector $c'$ it has a component $c''$ retarding the flow.

Naturally the circulation of liquid in the recesses of the brake is somewhat complex and turbulent so that the average velocity of the liquid past the openings of the inlet tubes will be a resultant of the velocities indicated by vectors $d$, $d'$, $e$, $e'$, and $c$, $c'$. The net result is therefore that while the flow of liquid out of the tubes is generally opposed in the prior art devices where the inlet passages were formed in the stator vanes, it is generally aided by the arrangement of tubes, such as shown in Figs. 18 and 19.

In the prior art of this type of hydro-dynamic brake, the passages for introducing the liquid to the rotor pockets were placed in the partitions or vanes separating the stator pockets and the partitions or vanes had to be made thicker at the points where the passageways were provided. Such thickened portions impeded the circulation of the fluid in the recesses and increased the turbulence therein. By introducing the liquid through nozzles or tubes mounted in openings formed in the wall separating the stator pockets from the chambers 20, the circulation of liquid in the stator pockets or recesses is not impeded and further it is possible to have larger and more efficiently designed pockets. By using tubes or nozzles, it is possible to utilize inlet passages of larger flow area than it would be practicably possible to provide in the stator vanes. With the nozzles in the direction as shown in Figs. 2, 18, and 19, it is possible to use larger inlet passageways as the fluid is induced into the brake and does not have to be forced under pressure.

Since the tubes are threaded into openings formed in the walls separating the recesses from the supply chambers of the stator parts, the tubes may be replaced when obstructed by corrosion or scale, or smaller tubes may be substituted if required or found desirable for particular applications. Also the flow of fluid through tubes or nozzles may be controlled by means of needle valves 68 such as shown in Fig. 3a, thus making it possible to have closer regulation of the braking action. Also the tubes or nozzles may be made accessible for cleaning without dismantling the brake by merely removing the needle valves, or if valves are not used, by merely removing plugs such as indicated at 46 to 48, inclusive, Figs. 2 and 3. It is to be understood that the nozzles do not have to be removable and that the inlet holes may be drilled in bosses provided for the purpose and located as described above for the nozzles.

Also by using large nozzles or tubes it is possible to obtain effective braking with a fewer number of inlets than would be required in the prior art dynamometer brakes where the inlet passages were located in the vanes separating the various stator pockets.

With the arrangement described above, the liquid need not be introduced to the brake under pressure, and in fact, practice has shown that no pressure is required at all. The action of the brake itself causes the fluid to be discharged from the outlet at the top of the stator and cool liquid to be introduced to the nozzle tubes to replace it. Therefore, it is apparent that the level of liquid in the annular chambers of the brake need only be at such a point as will cover the number of inlet tubes or nozzles necessary to supply the quantity of liquid required to keep the brake cool for the rate at which it is absorbing power.

As shown in Fig. 2, the inlet tubes are arranged concentrically about the axis of rotation of the rotor so that the water level in the brake may be progressively increased or decreased according to the braking action desired.

The above described hydro-dynamic brake is designed to be used in such applications where the power absorbed by the liquid is not so great as to raise the temperature of the liquid to prohibitively high temperatures and where sufficient cooling action is obtained by the recirculation of the water or liquid from the tank through the brake and back to the tank.

Where the energy to be absorbed by the liquid may be unusually high causing relatively high temperature rises in the liquid, a brake constructed as shown in Figs. 5 and 6 may be utilized.

The brake shown in Figs. 5 and 6 is designed with a view towards increasing the discharge of liquid from the brake and/or for increasing the pressure at which the liquid is discharged so that it may, if necessary, be forced into an elevated cooling tower and storage tank. If an elevated storage tank is used, the elevation provides the pressure or head that may be required to increase the flow of liquid through the inlet passages and to increase the pressure head, and therefore resistance, under which the brake operates. Also, as the elevated tank permits water to be introduced into the brake at a higher rate than would otherwise be obtained, the cooling of the brake for severe service is provided for.

Generally stated, the rotor of the brake shown in the drawings is mounted eccentrically with relation to the bore of the stator, so that the clearance between the rotor and stator is greater at the bottom than at the top. The rotor is provided with pump elements 70 (see Figs. 5, 6, 15, and 16) which are disposed for radial movement so that when the rotor is turning, these elements are held in contact with the bore of the stator by the action of centrifugal force. Thus, the rotor in combination with these elements and the raceway 82 of the stator constitutes a rotary pump by which liquid may be discharged at the outlet of the brake with considerable force, pressure and velocity.

With reference to Figs. 5 and 6, the brake there shown comprises a stator 71 having therein a rotor 72 similar to the rotor described in connection with the brake shown in Figs. 2 and 3. The stator is formed in two parts or halves 73 and 74 having a plurality of pockets or recesses 75 and 76 formed on the interior of the side walls which are separated by inclined or sloping vanes, blades, or partitions 77 such as described in connection with the brake of Figs. 2 and 3. The partitions in the stator pockets, however, differ from the partitions shown in Figs. 2 and 3 in that the inlet passages 78, which carry the water or liquid from the annular chambers 79 and 80 are disposed or formed in the stator vanes, as shown more particularly in Fig. 5. The inlet tubes or nozzles 21 shown in Figs. 18 and 19 may be utilized instead of the inlet passages 78, if desired, since the pump feature will function with either form or type of inlet.

Since the openings 78 are relatively large in diameter as compared to the thickness of the vanes, the vanes are provided with bosses 81 to thicken the vanes at the points where the passageways are formed. These openings or passageways terminate in the flat faces of the vanes at a point located about two-thirds up from the inner ends thereof. Therefore, the water or liquid which enters the brake from the annular chambers 79 and 80 is delivered to the recesses or passages in the rotor at the point where the turbulence is the least.

The stator parts are formed with a raceway 82 formed eccentrically with relation to the axis of rotation of the rotor. At the top of the rotor the raceway is slightly enlarged as at 83 to provide a discharge port from which liquid may be expelled into a pipe line that carries the liquid to a cooling tower or to an elevated tank.

Each stator part is provided with alined openings to accommodate bushings 27 and 28, such as shown and described in connection with Figs. 2 and 3, that form bearings or journal boxes for the rotor.

Figure 21:
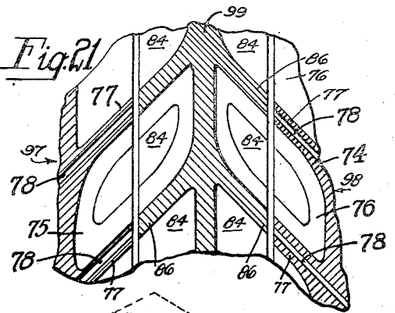

The rotor is constructed very much like the rotor shown in Figs. 2 and 3 and comprises a hub portion, which is hollow to accommodate a shaft (such as the shaft shown in Fig. 1) designed to extend through the bushings or journal boxes 27 and 28 and serve as journals for the rotor. Pockets or recesses 84 and 85 are formed on the opposite sides of the rotor and are substantially of the same shape and form as the pockets and recesses in the stator except that the vanes or partitions 86 of the rotor slope in the same direction as the vanes of the stator, as is apparent from Figs. 5 and 21, and as explained in the description of Figs. 2, 3, 18, and 19.

The rotor carries the pump elements 70, mounted at diametrically opposite sides of the rim thereof. The pump elements comprise shoes of substantially the same width as the rim of the rotor. The trailing edge of the shoes are beveled as shown at 87 so the area of the surface of the shoes that contact with or slide on the surface of the raceway 82 is relatively small. The rotor is slotted as indicated at 88 to permit guided movement of the shoes as they move radially inward and outward in accordance with the eccentricity of the raceway relative to the rim of the rotor.

Figure 15:
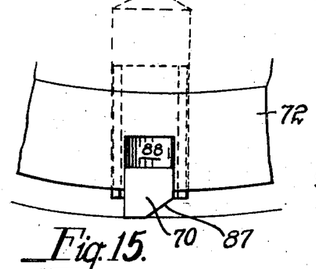
Figs. 15 and 16 are side elevational, and bottom plan views, respectively, of a pump feature embodied in the brake of Figs. 5 and 6.
Figure 16:
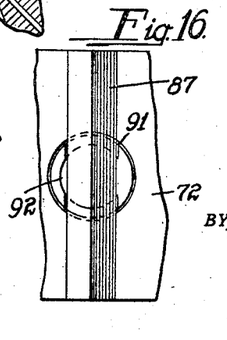

Each shoe may be provided with a hollow bushing 89 that operates in a tubular recess 90 formed in the rim of the rotor. The outer ends of the bushings may be slotted as at 91 to straddle the shoes, thus a space 92 is provided between each shoe and the bushing permitting free movement of liquid into and out of the recesses 90. The centrifugal force acting on the liquid trapped in the bushings 89 sets up a pressure that assists in urging the shoes into engagement with the raceway 82.

Since the diameter of the bushing is larger than the slot in the rotor, the bushing seals the slot in that it prevents a free passage of fluid around the sides and bottom of the shoe from one side of rotor rim to the other.

Provision is also made in the brake shown in Figs. 5 and 6 for introducing lubricant to the contacting surfaces of the bushings and the rotor hub. Also, seals 50 such as shown in connection with Fig. 3 are provided to prevent the escape of liquid from the brake through the space between the bushings and the hub.

In order that the stator may be drained when required, the bottom thereof is provided with an outlet port 93 which ordinarily is closed with a plug (not shown).

In order that water or liquid may be introduced into the annular chambers 79 and 80, inlets 94 and 95 are provided at the top of stator parts 73 and 74 which may be connected to the supply pipe (not shown) leading from a storage tank or the like. The outlet port 83 at the top of the stator part may be controlled by a valve (not shown) whereby it may be possible to completely close off the discharge port if desired. If the discharge valve is completely closed, the water or liquid thrown to the outer ends of the recesses in the rotor is directed across the space between the rotor pockets and the stator pockets, into the stator pockets with considerable force and velocity. The partitions of the rotor which cut through the streams of water absorb considerable power. Also the retarding of the streams of liquid together with the friction between the liquid and the walls of the recesses in the stator and the rotor expends considerable of the energy received from the rotor. It may be generally stated that the energy is imparted to the circulating fluid in the rotor and expended in the stator.

If, however, the discharge valve is open, considerable of the velocity and pressure built up in the liquid while in the rotor, is lost because of leakage between the rotor and the stator. As a result, the resistance of the brake can be controlled within certain limits by controlling the degree of opening of the discharge valve. It is possible that when the brake is operating, that the central portions of the recesses in the vicinity of the inlet passages 78 are void of water and filled with air or vapor. Where an elevated tank is used to provide the head or pressure at which the water is forced into the brake, the pump elements 70 provide the means within the brake itself to pump the liquid from the brake to such tank. Or, if a cooling tower is used, the rotating pump elements provide sufficient pump action to force the water or liquid into the cooling tower from which it may be discharged to the storage tank.

The brake shown in Figs. 5 and 6 may also be used with tanks which do not provide any more head than is necessary to completely fill the brake, provided the water or liquid is delivered from the stator supply chambers 79 and 80 through nozzles or tubes such as shown in Figs. 18 and 19. If such nozzles are used instead of the passageways 78 formed in the stator vanes, the rapidly circulating bodies of liquid collected in the rotor recesses or pockets provide sufficient aspirating action to induce ample flow of liquid through these nozzles into the rotor pockets to replace the warm liquid which is discharged through discharge port at the top of the brake. If such nozzles or inlet tubes are incorporated in the brake of Figs. 5 and 6, the pump elements of the brake may also be utilized to force the liquid through cooling coils before returning it to the tank. Or, in certain cases where the tank may be located at a considerable distance from the brake, the pump feature may be required to overcome the resistance in the piping between the brake and the tank.

The braking capacity of brake of Figs. 5 and 6 may be regulated between certain limits by incorporating the needle valve type of control shown in Fig. 3a with the nozzles or inlet tubes shown in Figs. 18 and 19. Also the braking action may be regulated within predetermined limits by regulating or adjusting both the discharge from port 83 and the needle valves until the desired action is obtained.

Figs. 7 to 14, inclusive, illustrate an optional means of controlling the resistance or braking action in brakes of this type. The fluid may be introduced into the brake through openings formed in the stator vanes such as shown at 78 in Figs. 5 and 21 or in Figs. 2, 3, 3a, 18 and 19. In general, it is possible to control the resistance of this type of brake by regulating the freedom of circulation of liquid between the recesses or pockets in the rotor and stator, and by varying the number of passageways which may be effective to conduct liquid into the pockets of the rotor.

Figure 7:
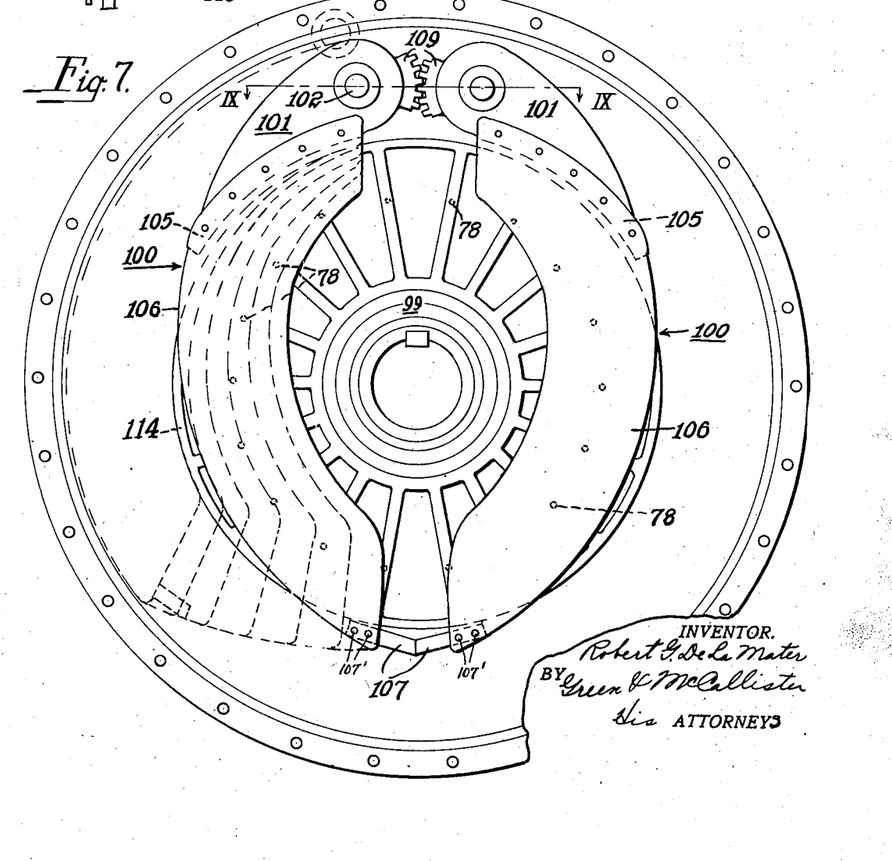
Fig. 7 is a side elevation of a brake with the front half of the stator removed showing a modified means of controlling the brake resistance.
Figure 8:
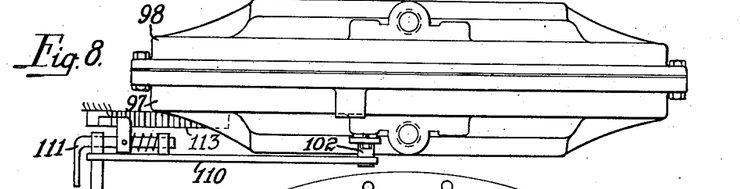
Fig. 8 is a top plan assembled view drawn to a reduced scale, of the brake shown in Fig. 7.
Figure 9:
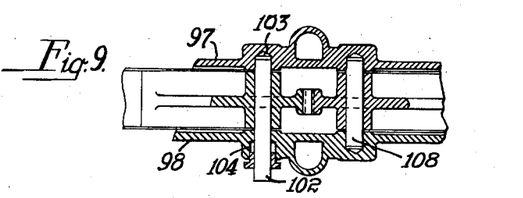
Fig. 9 is a partial view in section, taken on line IX—IX of Fig. 7 drawn to a reduced scale.
Figures 10, 11, 12, 13, 14:
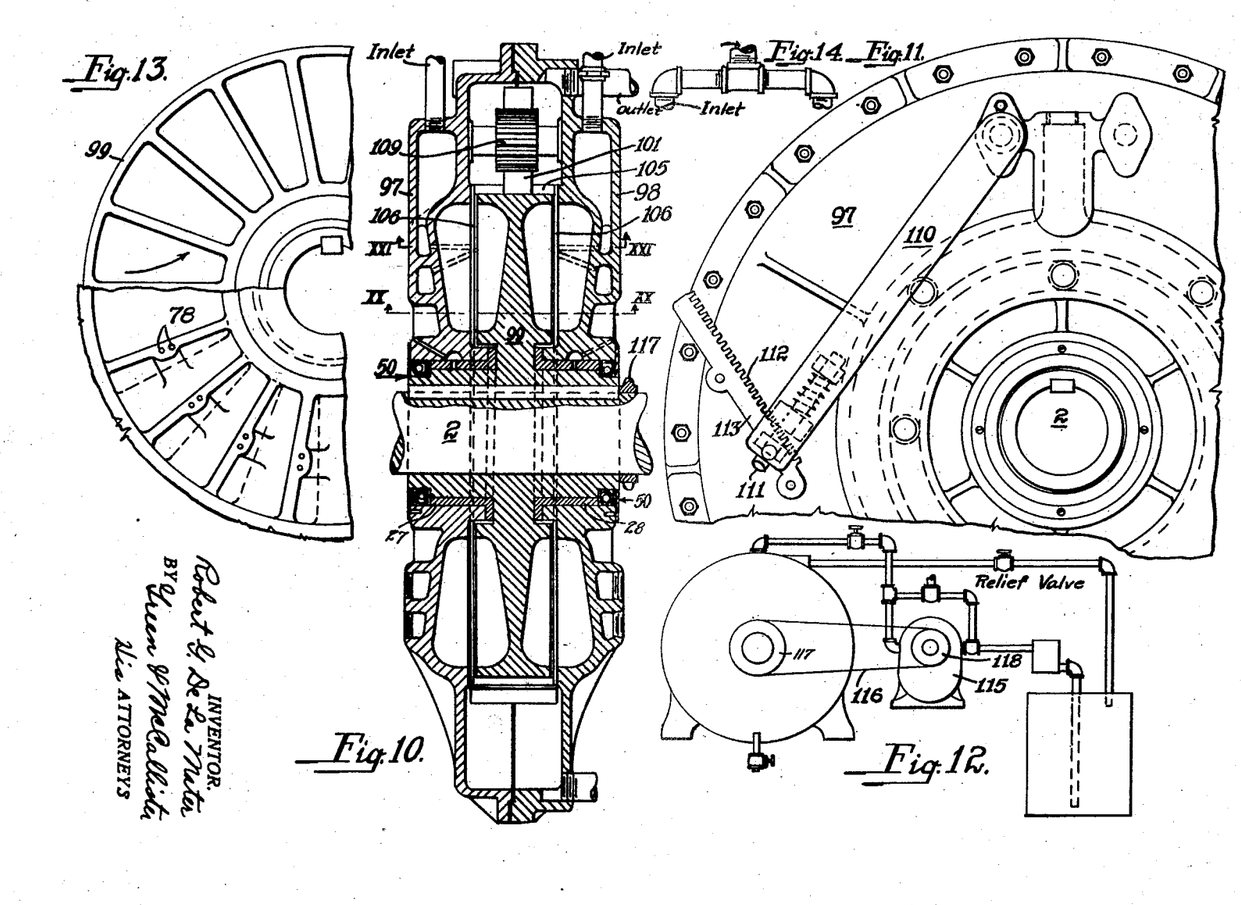
Fig. 10 is a view in vertical section of the brake shown in Figs. 7 and 8.
Fig. 11 is a fragmentary view in side elevation thereof.
Fig. 12 is a view of the brake shown in Figs. 7, 8, 10, and 11, having a supply tank and a pump for circulating liquid from the tank through the pump.
Fig. 13 is a fragmentary view in side elevation of the rotor and stator part of the brake.
Fig. 14 is a fragmentary view of inlet piping provided for the brake.
Figure 20:
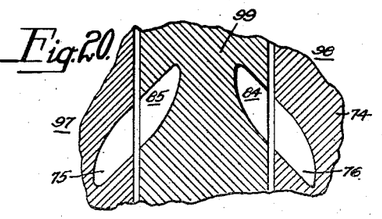
Figs. 20 and 21 are partial views in section taken on lines XX—XX and XXI—XXI, respectively, of Fig. 10.

The brake shown in Figs. 7 to 14, inclusive, and more particularly in Figs. 7 and 10, comprises a stator made up of stator parts 97 and 98 and a rotor, or impeller 99 which is rotatably supported by stator parts. The shape of the stator and rotor pockets at different radial distances from the center of the brakes is indicated by the fragmentary sectional views of Figs. 20 and 21 taken on lines XX—XX and XXI—XXI, respectively, of Fig. 10. The construction of the rotor and the stator, insofar as it is similar to the brake shown in Figs. 2, 3, 5, and 6, will be designated by the same reference characters.

In order to control the number of passageways in the stator vanes which are active to permit liquid to flow into the pockets or recesses of the rotor and also to regulate or control the extent of circulation of liquid between the rotor pockets and the stator pockets, a pair of sluice gates 100 are provided that straddle or embrace the rotor.

The sluice gates comprise a support arm 101 having a hub through which a trunnion 102 extends to support one of the sluice gates in the stator, as shown more particularly in Fig. 9. As illustrated, the stator part 97 is provided with a bearing 103 into which one end of the trunnion 102 extends, and stator part 98 is provided with an opening through which the other end of the trunnion projects to the outside of the brake. A stuffing box 104 is provided to prevent leakage of liquid from the interior of the brake through the stator part 98 at the point where the trunnion passes to the outside of the stator.

Figure 17:
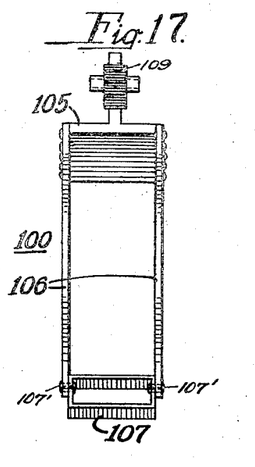
Fig. 17 is a bottom plan view of a sluice gate embodied in the pump of Figs. 7 to 12, inclusive.

The support arm also includes a body portion 105 (see Fig. 17) to which curved plates 106 are secured. Plates 106 are so spaced that they fit into the space between the rotor and the stator pockets. The lower end of the side plates 106 of each gate is secured to a spacer 107 with rivets 107' or other suitable means so that when the gates occupy the position shown in Fig. 7, the spacing members 107 meet at the vertical center line of the rotor thereby limiting the movement of the gates towards the center of the rotor.

Sluice gate 100 mounted on the right-hand side of the rotor as seen in Fig. 7 is mounted on a trunnion supported in bearings formed on the interior walls of the stator parts 97 and 98.

In order that the sluice gates may be turned simultaneously towards or away from the center of the rotor, the supporting arms 101 thereof are provided with intermeshing gear segments 109. Thus by turning trunnion 102, the sluice gates may be moved to various positions as indicated by the broken line position of the left-hand sluice gate. It is to be understood that the other sluice gate will occupy corresponding positions on the opposite side of the rotor.

To turn the sluice gates towards or away from the rotor, a crank arm 110 is provided and attached to trunnion 102. The outer end of the crank arm is provided with a pawl 111 adapted to be received in notches 112 formed in rack 113 which is stationarily mounted on the stator part 97. Thus by swinging the crank arm 110 in the desired direction, the sluice gates may be adjusted to the position in which the desired braking action is obtained. The pawl and rack hold the sluice gates in the position desired.

With an arrangement such as shown in Figs. 7 to 14, inclusive, the stator parts must be materially increased in diameter in order to provide space between the interior surface of the stator and the rim of the rotor in which the sluice gates may move.

As shown in Fig. 7, the openings 78 in the stator partitions or vanes are so located, and the curvature of the inner edges of the sluice gate side plates is so designed that the openings 78 may be progressively uncovered or covered depending upon the direction in which the sluice gates are moved. Thus with the arrangement shown, for each position of the sluice gates, a definite number of openings is uncovered and when the sluice gates occupy the position indicated by broken line 114, all of the openings are uncovered.

It will also be noted that as the sluice gates are moved away from or towards the center of the rotor, the resistance or braking action developed will vary with the quantity of liquid introduced to and maintained in the brake, and the number of recesses or pockets that are uncovered. The inlet holes in the stator vanes are therefore so arranged and the inner edges of the sluice gates are so curved that the inlet holes in the stator vanes are successively and progressively uncovered. By progressive covering and uncovering of the inlet passages and recesses or pockets in the stator and rotor, a smooth increase or decrease in braking resistance may be obtained.

If the brake shown in Figs. 7 to 14 is used in conjunction with a tank which is located at a level lower than that of the brake, and if the inlet passages shown in Fig. 13 are used instead of inlet nozzles of Fig. 18 or 19, a pump 115 (see Fig. 12) may be utilized to pump the water from the tank into the brake. The water discharged from brake flows by gravity to the tank. The pump may be coupled to the shaft on which the brake is mounted by means of a chain drive which includes a chain 116, a sprocket wheel 117 keyed to the shaft and a sprocket 118 mounted on the pump shaft.

While several forms of liquid friction hydrodynamic brakes embodying the invention have been disclosed herein, it will be appreciated by those skilled in this art that various modifications and changes may be made in the brake as a whole or in details of construction thereof, without departing from the spirit or the scope of the invention. It is desired therefore that only such limitations shall be placed on the invention as are imposed by the prior art and the appended claims.

What I claim as new and desire to secure by Letters Patent is:

1. The combination with a rotating shaft having a dynamic fluid friction brake operatively connected thereto, a supply tank having liquid therein, a conduit for conducting liquid from the tank to the brake, a conduit for returning liquid from the brake to the tank and means within said brake adapted to induce circulation of liquid from the tank to the brake and thence from the brake to the tank when said shaft is rotating.

2. The combination with a rotating shaft having a dynamic brake operatively connected thereto, a supply tank having liquid therein, a connection between the tank and brake adapted to control the quantity of liquid in the brake, means embodied with said brake adapted to induce circulation of liquid between the brake and tank when said shaft is rotating and means to vary the level of the liquid in the brake and tank so that the brake may operate either partially full or completely full in accordance with the braking action required.

3. The combination with a rotating shaft having a dynamic brake operatively connected thereto, a supply tank having liquid therein, a connection between the tank and brake adapted to control the quantity of liquid in the brake, means embodied with said brake adapted to induce circulation of liquid between the brake and tank when said shaft is rotating, means to vary the level of the liquid in the brake and tank so that the brake may operate either partially full or completely full in accordance with the braking action required, and a friction brake on said shaft adapted when applied to overcome the inertia of the moving load and to stop the same.

4. An hydro-dynamic brake comprising a stator having journal boxes therein, a rotor in said stator having journals integral therewith and disposed in said boxes for rotatably supporting the same within the stator, said rotor journals having a bore therethrough for the reception of a rotating shaft, there being means to hold the rotor fast on the shaft, and means within the brake for inducing circulation of braking liquid into and out of the same.

5. An hydro-dynamic brake comprising a stator having a rotor therein rotatably supported in the stator, said stator having a series of radially disposed pockets or recesses formed on the interior walls thereof on opposite sides of the rotor, said recesses being separated by vanes which slope in a direction opposite to that in which the rotor revolves when functioning as a brake, said rotor having a series of recesses or pockets on the opposite sides thereof of substantially the same shape as the stator recesses and occupying substantially the same position relative thereto, said rotor pockets being separated by vanes or partitions that slope in the direction of rotation of the rotor when functioning as a brake, and means for introducing streams of liquid into said brake in such direction that the velocity components of such streams are in the same general direction as that in which the rotor is rotating when functioning as a brake.

6. An hydro-dynamic brake comprising a stator having a rotor therein rotatably supported in the stator, said stator having a series of radially disposed pockets or recesses formed on the interior walls thereof on opposite sides of the rotor, said recesses being separated by vanes which slope in a direction opposite to that in which the rotor revolves when functioning as a brake, said rotor having a series of recesses or pockets on the opposite sides thereof of substantially the same shape as the stator recesses and occupying substantially the same position relative thereto, said rotor pockets being separated by vanes or partitions that slope in the direction of rotation of the rotor when functioning as a brake, liquid supply chambers on said stator, and inlet tubes extending through and removably supported by the side walls of at least some of the stator recesses for conveying liquid from said chambers into said brake.

7. An hydro-dynamic brake comprising a stator having a rotor therein rotatably supported in the stator, said stator having a series of radially disposed pockets or recesses formed on the interior walls thereof on opposite sides of the rotor, said recesses being separated by vanes which slope in a direction opposite to that in which the rotor revolves when functioning as a brake, said rotor having a series of recesses or pockets on the opposite sides thereof of substantially the same shape as the stator recesses and occupying substantially the same position relative thereto, said rotor pockets being separated by vanes or partitions that slope in the direction of rotation of the rotor when functioning as a brake, and inlet tubes disposed in openings formed in the side walls of at least some of said recesses for conveying liquid from said supply chambers to the rotor recesses, said tubes sloping in the same general direction as the rotor revolves when functioning as a brake.

8. An hydro-dynamic brake comprising a stator having a rotor rotatably supported by the stator, the interior of said stator having a series of radially disposed recesses formed concentrically about the rotor axis on the walls adjacent the sides of the rotor, said recesses being separated by vanes or partitions which slope in a direction opposite to the direction of rotation of the rotor when functioning as a brake, said rotor having a series of similarly shaped recesses formed on its opposite sides which occupy substantially the same position relative to the stator recesses, the rotor recesses being separated by inclined vanes which slope in the direction of rotation of the rotor when functioning as a brake, liquid supply chambers formed on the exterior side walls of the stator in superposed relation to the recesses thereof, and nozzle tubes mounted in the side walls of the recesses and communicating with said chambers, said nozzles being disposed at an angle to the rotor so that liquid discharged therefrom will have a velocity component in substantially the same direction as the movement of liquid in the rotor recesses when the rotor revolves in a direction to develop braking effort.

9. An hydro-dynamic brake comprising a stator having a rotor rotatably supported by the stator, the interior of said stator having a series of radially disposed recesses formed concentrically about the rotor axis on the walls adjacent the sides of the rotor, said recesses being separated by vanes or portions which slope in a direction opposite to the direction of rotation of the rotor when functioning as a brake, said rotor having a series of similarly shaped recesses formed on its opposite sides which occupy substantially the same position relative to the stator recesses, the rotor recesses being separated by inclined vanes which slope in the direction of rotation of the rotor when functioning as a brake, liquid supply chambers formed on the exterior side walls of the stator in superposed relation to the recesses thereof, nozzle tubes mounted in the side walls of the recesses and communicating with said chambers, said nozzles being disposed at an angle to the rotor so that liquid discharged therefrom will have a velocity in substantially the same direction as the movement of liquid in the rotor pockets when the rotor revolves in a direction to develop braking effort, and means for regulating the flow through said nozzles.

10. An hydro-dynamic brake comprising a stator having a rotor therein rotatably supported by the stator, said stator and rotor having coacting recesses or pockets of such shape and construction, that when the brake has liquid therein and the rotor is revolving high velocity jets are thrown from the rotor pockets to the stator pockets and redirected to the rotor pockets, the jets being severed by the rotor and stator recess walls, means for discharging liquid thrown to the top of the stator by the rotor, means to to introduce liquid into the rotor pockets, and means to regulate the flow of liquid so introduced.

11. A dynamic brake comprising a stator having a rotor therein, the stator and rotor having coacting pockets or recesses disposed concentrically about the axis of rotation of the rotor, means for introducing liquid to said brake, an outlet therefor, and means coacting with the rim of the rotor and the adjacent interior surface of the stator adapted to act as a pump to force liquid out of said outlet under pressure higher than that at which liquid is introduced to the brake.

12. An hydro-dynamic brake comprising a stator having a rotor therein, the stator and rotor having coacting radially disposed recesses formed concentrically about the axis of rotation of the rotor, said stator having a circular surface between the recesses at the interior periphery thereof formed eccentrically to the axis of rotation of the rotor, and pump elements mounted for radial movement in the rim of the rotor adapted to coact with said circular surface to form a pump.

13. An hydro-dynamic brake comprising a stator having a rotor therein, the stator and rotor having coacting radially disposed recesses formed concentrically about the axis of rotation of the rotor, said stator having a circular surface between the recesses at the interior periphery thereof formed eccentrically to the axis of rotation of the rotor, pump elements mounted for radial movement in the rim of the rotor adapted to coact with said circular surface to form a pump, means for introducing liquid into the rotor pockets, and an outlet through which liquid may be forced by said pump elements.

14. An hydro-dynamic brake comprising a stator having a rotor therein, said rotor having radially disposed sloping vanes therein formed on the walls on the opposite sides of the rotor, said rotor having radially disposed vanes on its opposite sides occupying substantially the same position as the stator vanes, and sloping in the opposite direction with respect thereto, means coacting with the rim of the rotor and the adjacent interior surface of the stator to pump liquid out of said stator, and means for introducing liquid to the brake in accordance with the amount of liquid pumped therefrom.

15. An hydro-dynamic brake comprising a stator having a rotor therein adapted to be rotated by a driven member, said stator and rotor having coacting pockets formed respectively on the interior side walls of the stator and the sides of the rotor, closed liquid supply chambers formed on the exterior surface of the stator side walls, openings in the stator pocket walls adapted to convey liquid to the interior of the brake, and means disposed to operate asymmetrically to the axis of rotation of the rotor for covering and uncovering said openings in predetermined order or sequence.

16. An hydro-dynamic brake comprising a stator having a rotor therein adapted to be rotated by a driven member, said stator and rotor having coacting pockets formed respectively on the interior side walls of the stator and the sides of the rotor, closed liquid supply chambers formed on the exterior surface of the stator side walls, openings in the stator pocket walls adapted to convey liquid to the interior of the brake, and means disposed to operate asymmetrically to the axis of rotation of the rotor for progressively covering or uncovering said openings in predetermined order or sequence, and simultaneously varying the communicative area between the rotor and stator pockets.

17. An hydro-dynamic brake comprising a stator having a rotor therein adapted to be rotated by a driven member, said stator and rotor having coacting pockets formed respectively on the interior side walls of the stator and the sides of the rotor, closed liquid supply chambers formed on the exterior surface of the stator side walls, openings in the stator pocket walls adapted to convey liquid to the interior of the brake, and barriers supported to swing asymmetrically within the stator and disposed between the rotor and stator pockets adapted to vary the communicative area between said pockets and to simultaneously cover or uncover said openings in predetermined order or sequence.

18. A fluid friction brake comprising a stator having a rotor therein, said stator having journal boxes in the side walls thereof and the rotor having journals disposed in the boxes, coacting recesses on the sides of the stator and rotor of such shape and construction that braikng effort is developed only when the rotor is revolving in one direction, and removable liquid seals mounted in the journal boxes of the stator in coacting relation with the rotor journals to preclude the escape of liquid from the stator through the journal boxes.

19. In combination, a rotating shaft for well drilling rigs adapted to be driven in one direction by the momentum of a cable suspended load and in the opposite direction by a motor to propel the load, an hydro-dynamic fluid friction brake comprising a stator and a rotor coupled to said shaft adapted to allow the speed of the load, when acting to drive the shaft, to increase rapidly to a relatively high value and thereafter hold the speed substantially constant, and means locking the stator against rotation in either direction, said brake being so constructed that negligible resistance is offered to turning of the shaft when driven by the motor.

20. An hydro-dynamic fluid friction brake comprising a stator and a rotor each having coacting recesses therein adapted to develop braking effort when the rotor is driven in one direction, said rotor having transverse slots in the rotor rim, radially movable pump elements in said slots, and means coacting with said elements and rotor adapted to prevent circulation of liquid through said slots from one side of the rotor to the other.

21. An hydro-dynamic brake comprising a stator and a rotor, sluice gates in the stator disposed for swinging movement towards or from the axis of rotation of the rotor, said gates each comprising a supporting member journalled in the stator, curved plates secured thereto and disposed on opposite sides of the rotor in the space between the stator and rotor, intermeshing gear segments on the supporting elements adapted to cause simultaneous movement of the sluice gates, and means exterior of the rotor adapted to swing said gates.

22. The combination with a rotating shaft having a portion overhanging a bearing therefor, of an hydro-dynamic brake mounted on said overhanging portion of the shaft, said brake including a rotor and a stator, the rotor having a spindle hub journalled in the stator, said hub having a bore for the reception of the shaft, and means to hold the rotor fast to the shaft.

23. An hydraulic friction brake comprising a stator having a rotor therein rotatably supported by the stator, said stator having a series of radially disposed pockets or recesses formed on the interior walls thereof on opposite sides of the rotor, said pockets being separated by vanes and formed so as to oppose the corresponding pockets of substantially the same shape in the rotor when functioning as a brake, and means responsive to rotation of the rotor for inducing the flow of liquid into the brake through passageways formed in the side walls of at least some of said recesses of the stator.

24. An hydrodynamic brake comprising a stator having a rotor therein, the stator and rotor having coacting radially disposed recesses formed concentrically about the axis of rotation of the rotor, said stator having a circular surface between the recesses at the interior periphery thereof formed eccentrically to the axis of rotation of the rotor, and an impeller mounted for radial movement in the rotor and coacting with said eccentric surface to produce a pump action.

25. An hydrodynamic brake comprising a stator having a rotor therein, the stator and rotor having coacting radially disposed recesses formed concentrically about the axis of rotation of the rotor, said stator having a circular surface between the recesses at the interior periphery thereof formed eccentrically to the axis of rotation of the rotor, means for introducing liquid into the rotor pockets, and an outlet through which liquid may be forced in response to the rotation of the rotor.

26. An hydrodynamic fluid friction brake comprising a stator and a rotor therein rotatably supported thereby, said rotor and stator each having a series of juxtaposed radially extending pockets or recesses, said rotor and stator pockets or recesses being separated by inclined vanes, the stator vanes sloping in a direction opposite to and the rotor vanes sloping in the same general direction as that in which the rotor revolves when functioning as a brake, and means for introducing streams of liquid into the rotor recess in such direction that the velocity components of such streams are in the same general direction as the rotor revolves when functioning as a brake.

27. An hydrodynamic fluid friction brake comprising a stator and a rotor therein rotatably supported thereby, said rotor and stator each having a series of juxtaposed radially extending pockets or recesses, said rotor and stator pockets or recesses being separated by inclined vanes, the stator vanes sloping in a direction opposite and the rotor vanes sloping in the same general direction to that in which the rotor revolves when functioning as a brake, and inlet tubes removably mounted in the side walls of at least some of said stator recesses, said tubes extending through the stator recesses and terminating short of the rotor recesses, said tubes being adapted to conduct liquid from a source of supply into the brake.

28. An hydrodynamic fluid friction brake comprising a stator and a rotor rotatably disposed therein, said stator and rotor each having a series of similarly shaped juxtaposed radially extending pockets or recesses, said stator and rotor pockets being separated by inclined vanes, the stator vanes sloping in a direction opposite to and the rotor vanes extending in the same general direction as the rotor revolves when functioning as a brake, a liquid supply chamber formed in the stator wall adjacent the recesses thereof, nozzle tubes mounted in the side walls of the stator recesses and communicating with said supply chamber, said nozzles being disposed at an angle to the rotor so that liquid discharging therefrom will have a velocity component in substantially the same direction as the movement of the liquid in the rotor recesses when the rotor revolves in a direction to develop braking effort.

29. An hydrodynamic fluid friction brake comprising a stator and a rotor rotatably disposed therein, said stator and rotor each having a series of similarly shaped juxtaposed radially extending pockets or recesses, said stator and rotor pockets being separated by inclined vanes, the stator vanes sloping in a direction opposite to and the rotor vanes extending in the same general direction as the rotor revolves when functioning as a brake, a liquid supply chamber formed in the stator wall adjacent the recesses thereof, nozzle tubes mounted in the side walls of the stator recesses and communicating with said supply chamber, said nozzles being disposed at an angle to the rotor so that liquid discharging therefrom will have a velocity component in substantially the same direction as the movement of the liquid in the rotor recesses when the rotor revolves in a direction to develop braking effort, and means for regulating the flow through said nozzles.

30. An hydrodynamic brake comprising a stator and a rotor rotatably supported within the stator, said stator and rotor having juxtaposed radially disposed vanes thereon, the rotor and stator vanes sloping in opposite directions with reference to the direction of rotation of the rotor, means coacting with the rim of the rotor and the adjacent interior surface of the stator to pump liquid out of the stator, and means for introducing liquid to the brake to replace the liquid pumped therefrom.

31. An hydrodynamic brake comprising a stator having a rotor therein adapted to be rotated by a driven member, said stator and rotor having coacting pockets formed on adjacent walls thereof, openings in the stator pocket walls adapted to convey liquid to the interior of the brake, and means operating asymmetrically to the axis of the rotor for covering and uncovering said openings in predetermined order or sequence.

32. An hydrodynamic brake comprising a stator having a rotor therein adapted to be rotated by a driven member, said stator and rotor having coacting pockets formed on adjacent walls thereof, openings in the stator pocket walls adapted to convey liquid to the interior of the brake and means operating asymmetrically to the axis of the rotor for progressively covering or uncovering said openings in predetermined order or sequence and simultaneously varying the communicative area between the rotor and stator pockets.

33. An hydrodynamic brake comprising a stator having a rotor therein adapted to be rotated by a driven member, said stator and rotor having coacting pockets formed on adjacent walls thereof, openings in the stator pocket walls adapted to convey liquid to the interior of the brake, a barrier supported to swing asymmetrically within the stator and disposed between said coacting rotor and stator pockets adapted to vary the communicative area therebetween and to simultaneously cover or uncover said openings in predetermined order or sequence.

34. An hydrodynamic fluid friction brake comprising a stator having a rotor therein rotatably supported one within the other, said stator and rotor each being formed with a series of juxtaposed radially extending pockets or recesses, said pockets being separated by vanes so formed that the rotor and stator pockets oppose each other when the rotor is functioning to develop braking effort, and means responsive to rotation of the rotor for inducing the flow of liquid into the brake through passageways formed in the side walls of at least some of the recesses of the stator.

35. The combination with a rotating shaft having a dynamic fluid friction brake oeratively connected thereto, a supply of liquid, means for circulating liquid through the brake, means for varying the liquid level in the brake so that the brake may operate either partially full or completely full in accordance with the braking action required, and a friction brake on said shaft adapted when applied to overcome the inertia of the moving load and to stop the same.

36. The combination with a rotating shaft having a dynamic brake operatively connected thereto, a supply tank having liquid therein, a connection between the tank and brake, means embodied within said brake adapted to induce circulation of liquid between the brake and tank when said shaft is rotating and means to vary the level of the liquid in the brake and tank so that the brake may operate either partially full or completely full in accordance with the braking action required.

37. In combination a rotating shaft of a hoist adapted to be driven in one direction by a source of power and to spool a cable from which a load is suspended and adapted to be driven by the suspended load in the other direction when the cable is unspooled, a fluid friction brake operatively connected to said shaft, said brake having a stator locked against rotation and inclosing a rotor free to rotate in either direction but developing effective resistance only for the direction of rotation when unspooling the cable, a band brake operatively connected to said shaft but independent of the fluid friction brake, said band brake adapted to augment the braking force of the fluid friction brake on the shaft and to overcome the inertia of the load and stop the same.

38. In combination, a rotating shaft connected to be driven by the momentum of a gravity accelerated load, a fluid friction brake comprising a stationary casing and a rotor in said casing connected to said shaft, said casing and rotor having coacting pockets for re-circulating fluid therebetween as the rotor revolves to develop braking resistance, the braking resistance being relatively low at low rotor rotative speeds and increasing to extremely high values at relatively high rotative speeds so that the speed of the load will increase rapidly to a high value and thereafter be held substantially constant by said brake, and a mechanical friction brake operatively connected to said shaft which when applied, augments the action of the fluid friction brake, overcomes the inertia of the load and stops the same.

39. In combination, a rotating shaft connected to be driven by the momentum of a gravity accelerated load, and a fluid friction brake comprising a stationary casing and a rotor in said casing connected to said shaft, said casing and rotor having coacting pockets for re-circulating fluid therebetween as the rotor revolves to develop braking resistance, the braking resistance being relatively low at low rotor rotative speeds and increasing to extremely high values at a relatively high rotative speed so that the speed of the load will increase rapidly to a high value and thereafter be held substantially constant by said brake, and means including a fluid supply system for the brake for regulating the braking resistance developed and thereby control the maximum speed attained for a given load.

40. In combination, a rotating shaft connected to be driven by the momentum of a gravity accelerated load, a fluid friction brake comprising a stationary casing and a rotor in said casing connected to said shaft, said casing and rotor having coacting pockets for re-circulating fluid therebetween as the rotor revolves to develop braking resistance, the braking resistance being relatively low at low rotor rotative speeds and increasing to extremely high values at a relatively high rotative speed so that the speed of the load will increase rapidly to a high value and thereafter be held substantially constant by said brake, means including a fluid supply-system for the brake for regulating the braking resistance developed and thereby control the maximum speed attained for a given load, and a mechanical friction brake operatively connected to said shaft which when applied, augments the action of the fluid friction brake, overcomes the inertia of the load and stops the same.

41. In combination, a rotating member connected to be driven by a gravity accelerated load, a fluid friction brake comprising stator and rotor members disposed one within the other and co-acting in response to relative rotation thereof to develop braking resistance by friction and agitation with fluid, the one of said brake members being operatively connected to the rotating member, the braking resistance increasing from a relatively low value at low load speeds, to higher values that increase at a greater rate than the load speeds so that the speed of the load may increase rapidly to a predetermined value and thereafter be held substantially constant by said brake, means within the brake for inducing circulation of fluid into and out of the brake, means for regulating the braking resistance developed by the brake, and a mechanical friction brake operatively connected to said rotating member which when applied, augments the action of the fluid friction brake, overcomes the inertia of the load and stops the same.

42. In combination, a rotating member connected to be driven by a gravity accelerated load, a fluid friction brake comprising a casing containing braking liquid and a cooperating braking member mounted in the casing, said casing and cooperating member being rotatable relative to each other and one of which is operatively connected to said load driven member for rotation thereby, said casing and cooperating member developing braking resistance by fluid friction and agitation that increases from a relatively low value at low load speeds to higher values that increase at a rate greater than the load speeds so that the speed of the load will increase rapidly to a predetermined higher value and thereafter be held substantially constant by said brake, means within the brake for inducing circulation of fluid into and out of the brake, means for regulating the braking resistance developed by the brake, and a mechanical friction brake operatively connected to said rotating member which when applied, augments the action of the fluid friction brake, overcomes the inertia of the load and stops the same.

43. In combination, a rotating member connected to be driven in one direction by a gravity accelerated load, a fluid friction brake connected to said rotating member for operation thereby and comprising at least two relatively rotating members, one of said members having a chamber therein for containing braking liquid and housing the other member therein, said members co-acting with each other and the fluid to develop braking resistance by fluid friction and agitation that increases, from a relatively low value, at low load speeds, to higher values at a greater rate than the load speeds so that the speed of the load will increase rapidly to a high value and thereafter be held substantially constant by said brake, means within the brake for inducing circulation of fluid into and out of the brake, means for regulating the braking resistance developed by the brake, and a mechanical friction brake operatively connected to said rotating member which when applied, augments the action of the fluid friction brake, overcomes the inertia of the load and stops the same.

44. In combination, a rotating member for drilling rigs adapted to be driven in one direction by a cable suspended load and in the opposite direction by a motor, and a fluid friction brake having fluid therein and comprising at least two relatively rotatable members disposed one within the other, one of which is connected to be driven by said rotating member, said brake allowing the speed of the load, when driven by said rotating member, to increase to a relatively high value and thereafter hold the speed substantially constant and means for locking the friction brake member which is not connected to said shaft against rotation in either direction, said brake offering substantially negligible resistance to the turning of said rotating member when driven by the motor.

45. The combination with a rotating shaft having a cable spooling drum thereon and a dynamic fluid friction brake operatively connected thereto, a supply of liquid, means for circulating liquid through the brake, means for varying the active quantity of liquid in the brake so that the brake may operate either partially full or completely full in accordance with the braking action required, and a mechanical friction brake on said shaft adapted when applied to augment the action of the fluid friction brake and arranged to finally stop the load at will.

46. The combination with a rotating shaft having a dynamic brake operatively connected thereto, a supply tank having liquid therein, a connection between the tank and brake adapted to control the quantity of liquid in the brake so that the brake may operate either partially full or completely full in accordance with the braking action required, means embodied within said brake adapted to induce circulation of liquid between the brake and tank when said shaft is rotating, and a friction brake on said shaft adapted when applied to augment the braking action of the friction brake and to stop the same.

47. The combination with a rotating shaft, of a fluid friction brake adapted to offer resistance to rotation of said shaft in one direction, said brake comprising two relatively rotatable parts adapted to be mounted upon the shaft, one of said parts being operatively connected thereto and means within the brake for inducing the flow of fluid into and out of the brake in response to relative rotation between said brake parts, and an auxiliary brake for augmenting the braking action of the fluid friction brake.

48. A dynamic fluid friction brake comprising stator and rotor members for co-acting with a fluid interposed between them to develop braking resistance, one of said members having an outlet, and a fluid ejecting element carried by one of said members for directing fluid through the discharge outlet of the brake in response to relative turning motion of said brake members.

49. An hydraulic friction brake comprising two relatively rotatable members having means for developing braking resistance by fluid friction and agitation when the relative motion between such brake members is such as to function as a brake, and means responsive to rotation of one of said brake members for inducing the flow of liquid into the brake through passageways formed in the side walls of one of said members.

50. An hydrodynamic fluid friction brake comprising relatively rotatable stator and rotor members supported one within the other, each of said members being formed with a series of juxtaposed radially extending pockets or recesses, said pockets being separated by vanes so formed that the rotor and stator pockets oppose each other when the rotor is functioning to develop braking effort, and means responsive to rotation of the rotor for inducing the flow of liquid into the brake through passageways formed in the side walls of at least some of the recesses of the stator.

51. An hydrodynamic fluid friction brake comprising a stator having a rotor therein, the stator and rotor having coacting radially disposed fluid agitating and friction producing elements formed concentrically about the axis of rotation of the rotor, said stator having a circular surface between said elements and the interior periphery thereof formed eccentrically to the axis of rotation of the rotor, said rotor coacting with said eccentric surface to produce a pump action effective to discharge liquid from the brake.

52. A winding drum having a hydraulic brake operatively connected thereto, said brake having a portion enclosing a space for liquid, a bladed impeller disposed within said space, power operated means for rotating the drum and the impeller together in the same direction, and means for releasing the drum from the power operated means to permit it to rotate in an opposite direction whereby to cause the impeller to act with said liquid space enclosing portion as an hydraulic brake to check the speed of the drum.

53. In a hoist, a shaft, a drum mounted for rotation with the shaft and having a brake operatively connected to said drum, said brake having a portion enclosing a space for liquid, an impeller mounted upon said shaft for rotation therewith and having blades disposed within said space, power operated means for rotating said impeller and drum, and a clutch means mounted in operative relation to the shaft for engaging the shaft with the power operated means or for disengaging it therefrom.

54. In a draw works, a shaft, a drum mounted upon the shaft and having a brake operatively connected thereto, said brake enclosing a chamber for liquid, a hand-operated brake operatively connected to said shaft, an impeller mounted upon and connected to said shaft and having blades extending into said chamber, power operated means for rotating the impeller, drum and shaft, and a clutch mechanism for connecting the shaft to or disconnecting it from the power operated means.

55. In a draw works, the combination with a winding drum having a manually operable brake for controlling the unwinding movement of the drum, power operated means for rotating the drum, clutch means for connecting the power operated means to the drum or disconnecting it therefrom, and a hydraulic brake automatically operated to resist the rotation of the drum when the drum is disconnected from the power operated means and is rotating in a direction opposite thereto.

56. A winding drum having a brake housing enclosing a space for braking liquid, a bladed impeller disposed within said space and operatively connected to the drum, means for rotating the drum and impeller together in the same direction and means for releasing the drum from the power operated means to permit it to rotate freely relative to the impeller housing, whereby to cause the impeller to act as an hydraulic brake for the drum.

57. A winding drum and a brake, the elements of which comprise a housing for containing braking liquid, and an impeller brake element within the housing, one of said brake elements being operatively connected to the winding drum and rotatable relative to the other brake element, power operated means for rotating the drum and one of said brake elements together in the same direction, and means for releasing the drum from the power operated means to permit it and its connected brake element to rotate relative to the other of said brake elements whereby said impeller and housing coact as an hydraulic brake to check the speed of the drum.

58. In a brake system for hoists, a reel adapted to be driven in one direction by a motor to raise the load and in the other direction by the load when lowering the load, a brake comprising an outer casing containing fluid and a relatively rotatable member disposed therein, said inner rotatable member being operatively connected to said reel and both elements coacting with the fluid so as to develop resistance exclusively by friction and agitation of the fluid and effective to automatically resist the rotation and govern the speed of the hoist only when the load is being lowered, the energy being dissipated by heating of the fluid circulated within the brake, and a mechanical friction brake adapted to stop and hold the load.

59. In combination with a hoist having a cable reel adapted to be driven in one direction by a motor to raise a load suspended from the cable and in the opposite direction by the load when lowering the same, a fluid friction brake connected to the reel for offering resistance and automatically governing the speed of the reel only when lowering a load and developing braking resistance at a rate which increases faster than the rate of increase in reel speed, said brake comprising spaced relatively rotatable brake members disposed one within the other with one of said members connected to the reel, and the brake containing a quantity of liquid in which the energy for governing the speed of descent is wholly developed and dissipated by the coaction of said brake elements with said liquid when there is relative rotation between them, and a mechanical brake for stopping the reel at will.

60. In combination with a hoist having a cable reel adapted to be driven in one direction by a motor to raise a load suspended from the cable and in the opposite direction by the load when lowering the same, a fluid friction brake connected to the reel for offering resistance and automatically governing the speed of the reel only when lowering a load and developing braking resistance at a rate which increases faster than the rate of increase in reel speed, said brake comprising spaced relatively rotatable brake members disposed one within the other with one of said members connected to the reel, and the brake containing a quantity of liquid in which the energy for governing the speed of descent is wholly developed and dissipated by the coaction of said brake elements with said liquid when there is relative rotation between them, means for adjusting the braking action developed in the fluid of said fluid friction brake, and a mechanical brake for stopping the reel at will.

ROBERT GRIFFIN DE LA MATER.